No. 765,594. PATENTED JULY 19, 1904.
J. S. RANDALL.
DRAFT ATTACHMENT FOR BINDERS.
APPLICATION FILED DEC. 19, 1903.
NO MODEL.
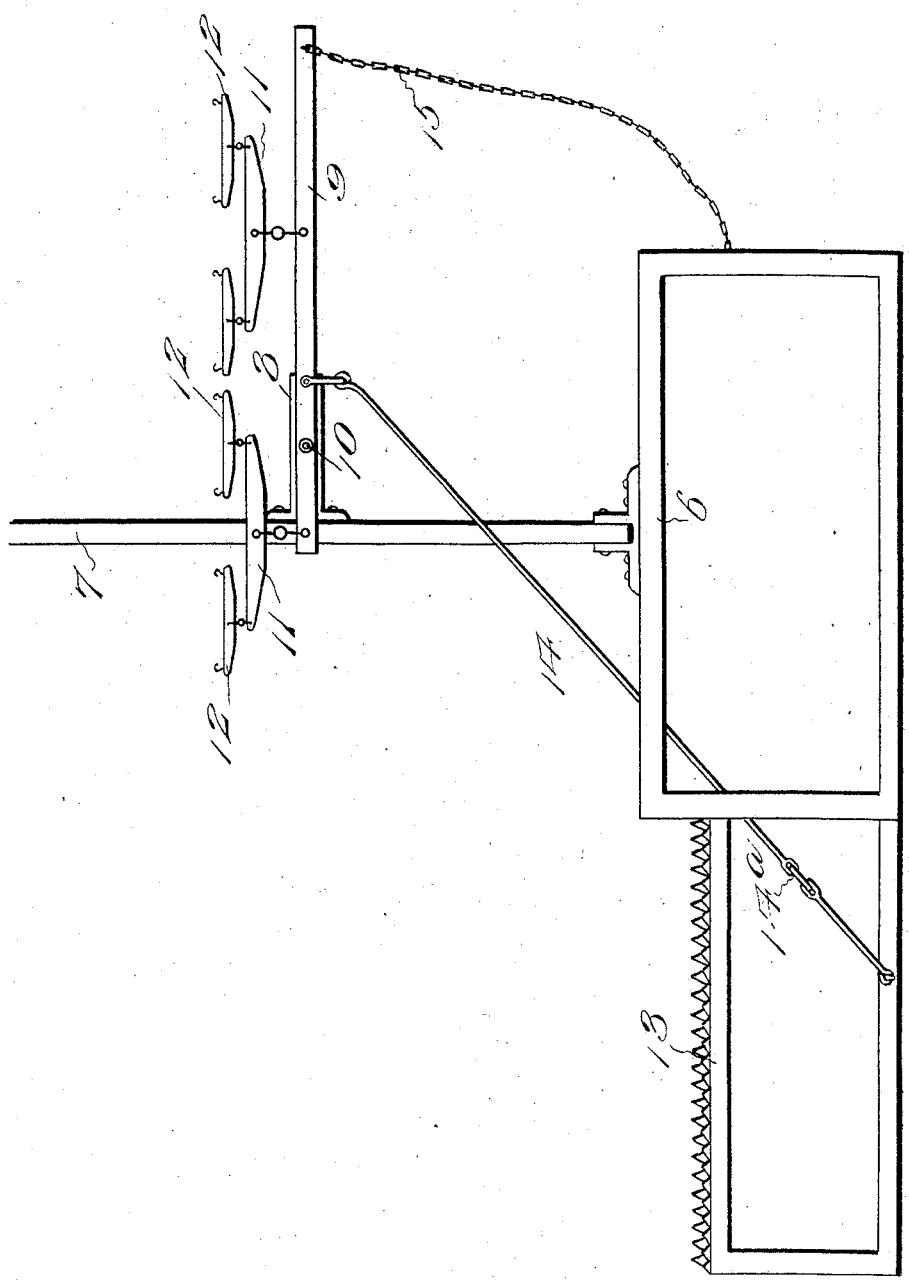
Inventor
J. S. Randall,
By Victor J. Evans
Attorney
Witnesses No. 765,594.

Patented July 19, 1904.

UNITED STATES PATENT OFFICE.

JOHN S. RANDALL, OF JEFFERS, MINNESOTA.

DRAFT ATTACHMENT FOR BINDERS.

SPECIFICATION forming part of Letters Patent No. 765,594, dated July 19, 1904.

Application filed December 19, 1903. Serial No. 185,847. (No model.)

*To all whom it may concern:*

Be it known that I, JOHN S. RANDALL, a citizen of the United States, residing at Jeffers, in the county of Cottonwood and State of Minnesota, have invented new and useful Improvements in Attachments for Binders, of which the following is a specification.

This invention relates particularly to draft attachment of binders, and has for its object to equalize the draft for three or four horse teams and also to provide a turning device to facilitate the turning of the machine and take the side pull off the tongue team during that action.

It embodies a draft-rod connected at its front end to the evener-bar and at its rear end to the rear of the cutter-bar, which takes the side draft incident to the cutters; also, a chain connected to the evener and to the frame of the machine, the side opposite to the cutter-bar, which chain slacks during straight haul, but tightens during a turn, so that the off team takes the turn draft and relieves the near or tongue team therefrom.

The invention is illustrated in the accompanying drawing, which is a plan view of the device.

Referring specifically thereto, the front frame of the machine is indicated at 6, to which is attached the tongue 7. An arm 8 extends laterally from the tongue and carries the evener or equalizing bar or lever 9, pivoted thereto at 10. Connected to this bar are the doubletrees 11 and swingletree 12, illustrated as for a four-horse team. The connection for the near or pole team is even with the tongue to put one horse on each side thereof, and the off team is connected on the other side of the pivot.

The cutter-bar or its frame is shown at 13. At or about its middle is hitched the rear end of the draft-rod 14, which extends thence diagonally under the corner of the platform and over the tongue to a connection to the equalizing-bar between its pivot and the off-team hitch. This bar has a loose link 14ª to permit slack in turning and takes the side draft when the machine is cutting.

The outer or off end of the equalizing-bar is connected by a chain 15 to the corresponding side of the frame, and it is to be noted that the off-team connection is between this chain and the pivot of the equalizer. This gives quick action in turning and relieves the tongue team entirely during that action.

In operation during straight draft the chain 15 is slack and the rod 14 is taut, and the teams take their equal haul, the rod preventing side draft. When turning, the pole-team is held back and the off team swings the equalizing-bar, which tightens the chain and rod, and the machine is turned accordingly, relieving the tongue team of any side haul, and all it has to do is to step around out of the way.

Having thus fully described the invention, what I claim as new is—

1. In a draft attachment for binders or the like, the combination with an equalizing-bar pivotally connected to the tongue and having attaching devices for the draft-animals, of a rod connected to the said bar at one end between the pivot of the latter and the outer extremity of the same, said rod also being attached to the cutter-bar frame, and a chain connected to the outer end of the said equalizing-bar and to the side frame of the machine opposite the cutter-bar.

2. In a draft attachment for binders or the like, the combination of an equalizing-bar pivotally connected to the tongue of the machine and having draft-animal attachments arranged on opposite sides of the pivot thereof, and connections between the equalizing-bar outside of the pivot of the latter and the cutter-bar and between the outer end of the equalizing-bar and the side of the frame of the machine opposite the cutter-bar.

3. In a draft attachment for binders or the like, the combination with a tongue having a laterally-extending arm, an equalizing-bar pivoted to said arm and having whiffletrees attached thereto on each side of its pivot, and a draft connection attached to a portion of the machine at one side and also to the said bar at a distance outwardly from the pivot thereof, of a turning connection between the opposite side of the machine and the outer end of the bar.

4. In a draft attachment for binders or the like, the combination with a tongue having a laterally-extending arm, an equalizing-bar pivoted on the said arm, and whiffletrees connected to the bar on opposite sides of the pivot of the latter, of a draft-rod attached to the bar outside of, but adjacent to the pivot thereof and extending diagonally across the tongue and connecting with the cutter-bar of the machine, and a turning connection attached to the outer end of the bar and to the side of the machine opposite that having the cutter-bar connected thereto.

In testimony whereof I affix my signature in presence of two witnesses.

JOHN S. RANDALL.

Witnesses:
C. R. DUROE,
J. H. McLAUGHLIN.